United States Patent
Chou (10) Patent No.: US 9,660,986 B2
(45) Date of Patent: May 23, 2017

(54) SECURE ACCESS METHOD AND SECURE ACCESS DEVICE FOR AN APPLICATION PROGRAM

(71) Applicant: Hung-Chien Chou, Taichung (TW)

(72) Inventor: Hung-Chien Chou, Taichung (TW)

(*) Notice: Subject to any disclaimer, the term of this patent is extended or adjusted under 35 U.S.C. 154(b) by 351 days.

(21) Appl. No.: 14/599,293

(22) Filed: Jan. 16, 2015

(65) Prior Publication Data

US 2015/0207792 A1  Jul. 23, 2015

(30) Foreign Application Priority Data

Jan. 21, 2014 (TW) .............................. 103102096 A (51) Int. Cl.
*H04L 29/06* (2006.01)
*G06F 21/44* (2013.01)
*G06F 21/51* (2013.01)
*G06F 21/82* (2013.01)

(52) U.S. Cl.
CPC .......... *H04L 63/0869* (2013.01); *G06F 21/44* (2013.01); *G06F 21/51* (2013.01); *G06F 21/82* (2013.01); *H04L 63/0838* (2013.01); *H04L 63/1441* (2013.01)

(58) Field of Classification Search
CPC ............. H04L 63/0869; H04L 63/1441; H04L 63/0838; G06F 21/82; G06F 21/44; G06F 21/51
See application file for complete search history.

(56) References Cited

U.S. PATENT DOCUMENTS

| 8,539,602 B2 | 9/2013 | Chowdhury et al. |
| 2004/0078565 A1* | 4/2004 | Hofmeister ............. G06F 21/51 713/156 |
| 2006/0083228 A1* | 4/2006 | Ong ........................ G06F 21/34 370/389 |

(Continued)

FOREIGN PATENT DOCUMENTS

| EP | 1577780 A1 | 9/2005 |
| EP | 1959370 A1 | 8/2008 |

(Continued)

OTHER PUBLICATIONS

Extended European Search Report mailed Jun. 26, 2015, in European Patent Application No. 15151538.4, filed Jan. 16, 2015, 3 pages.

(Continued)

*Primary Examiner* — Brian Shaw
(74) *Attorney, Agent, or Firm* — Christensen O'Connor Johnson Kindness PLLC (57) ABSTRACT

A secure access method for an application (app) program is to be implemented by a secure access device, which includes first authentication data and a first control regulation. The secure access method includes the steps of making a determination as to whether a to-be-authenticated app program, which is executed in an operating system, is provided with the first authentication data and the first control regulation; and, when a result of the determination is negative, identifying the to-be-authenticated app program as an unauthenticated illegitimate app program, and disallowing the illegitimate app program to access a to-be-accessed device.

20 Claims, 3 Drawing Sheets

(56) References Cited

U.S. PATENT DOCUMENTS

| | | | | |
|---|---|---|---|---|
| 2006/0126422 A1* | 6/2006 | Takagi | ............... | G06F 12/1433 |
| | | | | 365/232 |
| 2006/0136889 A1* | 6/2006 | Han | ..................... | G06F 21/51 |
| | | | | 717/162 |
| 2009/0287939 A1* | 11/2009 | Takekawa | ............... | G06F 21/31 |
| | | | | 713/189 |
| 2012/0131353 A1 | 5/2012 | Nasir et al. | | |

FOREIGN PATENT DOCUMENTS

| | | |
|---|---|---|
| JP | 2007183931 A | 7/2007 |
| TW | 200937198 A | 9/2009 |
| TW | 201403377 A | 1/2014 |

OTHER PUBLICATIONS

Search Report issued Jun. 12, 2015, in Taiwanese Patent Application No. 103102096, filed Jan. 21, 2014, 2 pages.

\* cited by examiner

SECURE ACCESS METHOD AND SECURE ACCESS DEVICE FOR AN APPLICATION PROGRAM

CROSS-REFERENCE TO RELATED APPLICATION

This application claims priority of Taiwanese Patent Application No. 103102096, filed on Jan. 21, 2014.

FIELD OF THE INVENTION

The invention relates to a secure access method and a secure access device for an application program (app program), more particularly to a method and a device for secure access by an app program of a to-be-accessed device, so as to prevent an illegitimate app program from accessing the to-be-accessed device.

BACKGROUND OF THE INVENTION

Due to the rapid development and popularization of information technology in the present days, all kinds of convenient application programs (app programs) have been brought into existence correspondingly. Be it a user of an app program or a provider thereof, whether there are sufficient security measures for services provided by the app program has always been of great concern. If an attacker implants malicious software into the app program, during operation of the app program by the user, private data may be stolen, documents may be damaged, and an operation screen may be hijacked. As a result, important private data of the user are leaked or damaged, and irreparable loss is caused.

In this way, how to prevent an app program from being copied, tampered with, or implanted with malicious software to result in burglar and damage of important private data has become an issue desired to be overcome.

SUMMARY OF THE INVENTION

Therefore, an object of the present invention is to provide a secure access method for an application program (app program) so as to prevent an illegitimate app program from accessing a to-be-accessed device.

Accordingly, the secure access method for an application (app) program of the present invention is to be implemented by a secure access device, which includes first authentication data and a first control regulation. The secure access method includes the steps of:

A) making a determination as to whether a to-be-authenticated app program, which is executed in an operating system, is provided with the first authentication data and the first control regulation; and B) when a result of the determination made in step A) is negative, identifying the to-be-authenticated app program as an unauthenticated illegitimate app program, and disallowing the illegitimate app program to access a to-be-accessed device.

Another object of the present invention is to provide a secure access device for an application program (app program) so as to prevent an illegitimate app program from accessing a to-be-accessed device.

Accordingly, the secure access device for an app program of the present invention is to be coupled between a main memory, which is loaded with an operating system, and a to-be-accessed device. The secure access device is configured to determine whether a to-be-authenticated app program executed in the operating system is allowed to access the to-be-accessed device. The secure access device includes an authentication data generation unit, a control regulation generation unit and an authentication unit. The authentication data generation unit is configured to generate a first authentication data. The control regulation generation unit is configured to generate a first control regulation. The authentication unit is configured to make a determination as to whether the to-be-authenticated app program executed in the operating system is provided with the first authentication data and the first control regulation. When a result of the determination is negative, the authentication unit identifies the to-be-authenticated app program as an unauthenticated illegitimate app program, and disallows the illegitimate app program to access the to-be-accessed device.

An effect of the present invention resides in that, by means of the secure access device which determines whether the to-be-authenticated app program executed in the operating system includes the first authentication data and the first control regulation, the illegitimate app program which is not provided with the first authentication data and the first control regulation is prevented from accessing the to-be-accessed device, so that a computer may be free from security threats.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
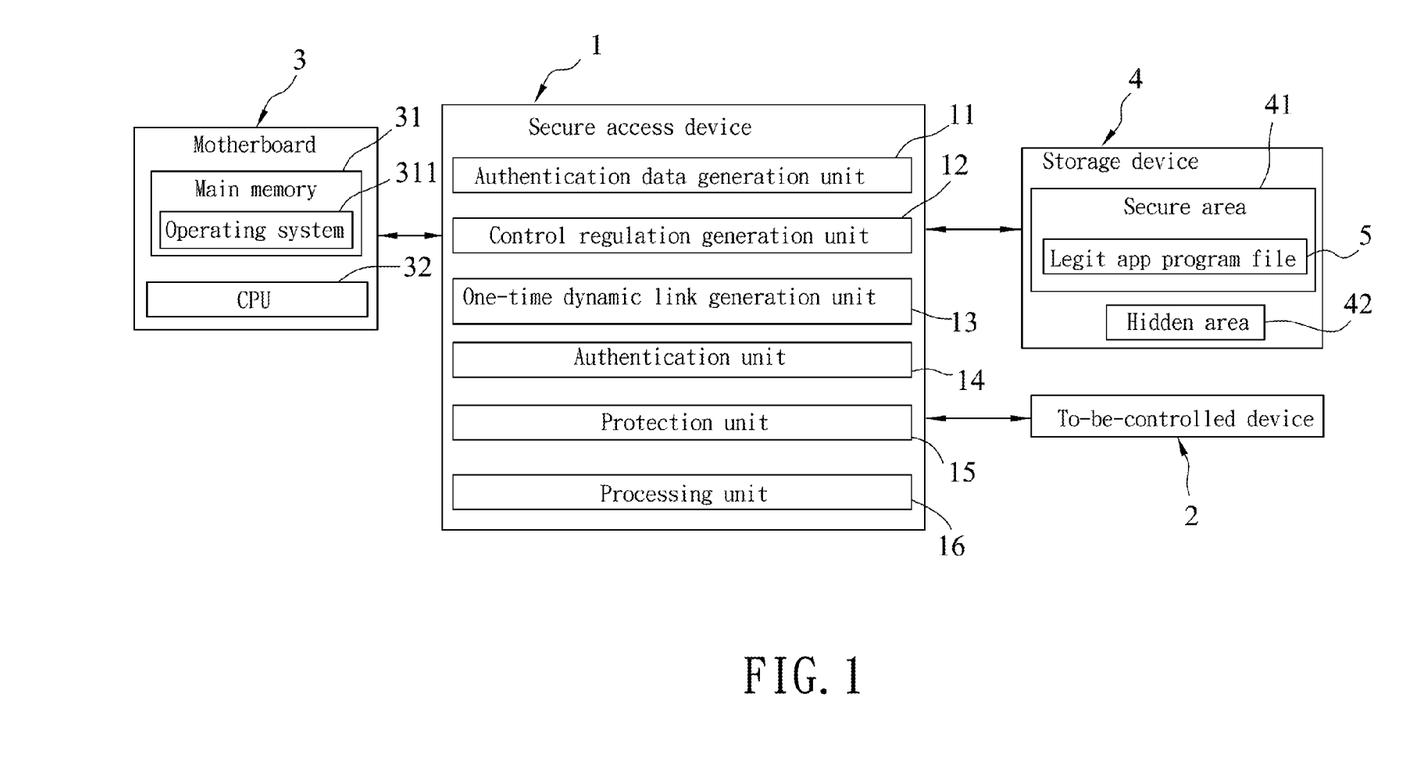
FIG. 1 is a block diagram illustrating an embodiment of a secure access device for an application program (app program) according to the present invention.

Referring to FIG. 1, an embodiment of a secure access device 1 for an application program (app program) according to the present invention is configured to determine whether a to-be-authenticated app program, which is executed in an operating system 311, is allowed to access a to-be-accessed device. The secure access device 1 includes an authentication data generation unit 11, a control regulation generation unit 12, a one-time dynamic link generation unit 13, an authentication unit 14, a protection unit 15 and a processing unit 16. It is noted that the secure access device 1 for an app program is realized in a form of firmware, and a practical embodiment of the secure access device 1 may be a chip, which is to be installed in a personal computer (PC), a notebook computer, a tablet computer, a smart phone, a computing system that includes a storage device and a to-be-controlled device, etc. For a PC that is installed with the chip, the PC would include the secure access device 1, among components inclusive of a motherboard 3, a to-be-controlled device 2 and a storage device 4. It is noted that the to-be-controlled device 2 and the storage device 4 cooperatively serve as the to-be-accessed device which is to be accessed by the app program.

The motherboard 3 includes a main memory 31 and a central processing unit (CPU) 32.

The to-be-controlled device 2 includes at least one of a communication unit, such as a near-field communication unit, a storage unit, such as a hard disk, a flash memory, or any other memory unit, and a periphery unit, such as a keyboard, a computer mouse, and so forth.

The authentication data generation unit 11 is configured to generate first authentication data, which includes at least one of a one-time authentication algorithm, a one-time password and a one-time authentication code.

The control regulation generation unit 12 is configured to generate a first control regulation, which includes at least one of a one-time access regulation and a one-tome instruction regulation. The one-time access regulation is an access regulation on instructions transmitted by a legit app program, which is executed in the operating system 311, to the processing unit 16, for example, a regulation as to whether the legit app program is allowed to issue instructions to the processing unit 16 to access the communication unit, the storage unit and the peripheral unit of the to-be-controlled device 2, a regulation as to whether the legit app program is allowed to issue instructions to the processing unit 16 to change access attributes of a file stored in a secure area 41 of the storage device 4, and an access regulation on instructions transmitted by the legit app program to the processing unit 16 for accessing a hidden area 42 of the storage device 4. Notably, the hidden area 42 cannot be detected, read or written by the operating system 311. The one-time instruction regulation is a code regulation on instructions for the processing unit 16 and the legit app program. For example, the one-time instruction regulation defines instruction code between the legit app program and the processing unit 16, e.g., 0000 stands for a read instruction and 0001 stands for a write instruction. It is noted that, corresponding to different legit app programs, the authentication data generation unit 11 and the control regulation generation unit 12 are able to generate distinct first authentication data and first control regulation for each different legit app program.

The one-time dynamic link generation unit 13 is configured to generate a first one-time dynamic link program based on the first authentication data and the first control regulation. The first one-time dynamic link program is a program which can be executed directly by the operating system 311. It is noted that, in this embodiment, the one-time dynamic link generation unit 13 is configured to incorporate the first authentication data and the first control regulation into the first one-time dynamic link program, which is subsequently provided to the legit app program. After receiving the first one-time dynamic link program, the legit app program generates the first authentication data and the first control regulation based on the first one-time dynamic link program. However, in a variation of this embodiment, the first authentication data and the first control regulation may be provided to the legit app program in a separate manner from the first one-time dynamic link program, i.e., without combining the first authentication data and the first control regulation into the first one-time dynamic link program, and the way of providing the same is not limited to the disclosure herein.

With the secure access device 1 coupled between the to-be-controlled device 2 and the main memory 31 which is loaded with the operating system 311, the to-be-authenticated app program executed in the operating system 311 is required to complete mutual authentication with the authentication unit 14 of the secure access device 1 so as to control the to-be-controlled device 2. It is noted that when the legit app program executed in the operating system 311 intends to access the to-be-accessed device, the legit app program is required to be authenticated by the secure access device 1, and thus serves as the to-be-authenticated app program executed in the operating system 311. Detailed operation of the authentication unit 14 and an authentication process are described hereinafter.

The authentication unit 14 is configured to make a determination as to whether the to-be-authenticated app program executed in the operating system 311 includes the first authentication data and the first control regulation. When a result of the determination thus made is negative, it means that the to-be-authenticated app program is an unauthenticated illegitimate app program, and the authentication unit 14 disallows the illegitimate app program to control the to-be-controlled device 2. When the result of the determination thus made is affirmative, the mutual authentication is to be performed. Specifically, the authentication unit 14 receives the first authentication data from the to-be-authenticated app program, and proceeds to authenticate the to-be-authenticated app program. On the other hand, the authentication unit 14 transmits the first authentication data, which is generated by the authentication data generation unit 11, to the to-be-authenticated app program, such that the to-be-authenticated app program receives the authentication data therefrom so as to proceed to authenticate the secure access device 1.

When the authentication unit 14 and the to-be-authenticated app program complete the mutual authentication therebetween, it means that the to-be-authenticated app program is the legit app program that corresponds to the legit app program file 5, and the secure access device 1 identifies the to-be-authenticated app program as the legit app program. The legit app program encrypts an instruction, which conforms to the first control regulation, using the first authentication data of the legit app program to obtain an encrypted instruction, and transmits the encrypted instruction to the processing unit 16. The authentication unit 14 activates the processing unit 16 such that the processing unit 16 receives the encrypted instruction and decrypts the encrypted instruction according to the first authentication data, which is generated by the authentication data generation unit 11, to obtain a decrypted instruction. Subsequently, the processing unit 16 controls the to-be-controlled device 2 based on the decrypted instruction, such that the legit app program is able to achieve an effect of controlling the to-be-controlled device 2 via the processing unit 16. In other words, even if the mutual authentication has been completed, the legit app program executed in the operating system 311 is unable to directly control the to-be-controlled device 2. The legit app program is still required to control the to-be-controlled device 2 via the processing unit 16 of the secure access device 1.

In addition, since the secure access device 1 is coupled between the storage device 4 and the main memory 31 which is loaded with the operating system 311, when the operating system 311 intends to access the secure area 41 of the storage device 4 so as to load a legit app program file 5 for execution thereby, the operating system 311 is required to load the legit app program file 5 via the secure access device 1. The legit app program file 5 is loaded into the main memory 31, and is executed in the operating system 311 by the CPU 32 to serve as the legit app program. Further, the protection unit 15 of the secure access device 1 is configured to provide the first one-time dynamic link program to the legit app program. Detailed operation of the protection unit 15 is explained hereinafter.

When the operating system 311 is accessing the secure area 41 of the storage device 4 so as to load the legit app program file 5 and a corresponding preset one-time dynamic link program, such as a dynamic link library (DLL) file, both being stored in the secure area 41, and when the legit app program file 5 is executed by the operating system. 311 after loading so as to serve as the legit app program, the protection unit 15 is configured to transmit the first one-time dynamic link program to the legit app program executed in the operating system 311, and the first one-time dynamic link program is substituted for the preset one-time dynamic link program. The operating system 311 is not able to delete or write the legit app program file 5 stored in the secure area 41. In this embodiment, the legit app program file 5 and the preset one-time dynamic link program are two separate files. The operating system 311 is configured to read the legit app program and the first one-time dynamic link program individually, that is, to read the legit app program first and then read the first one-time dynamic link program which is to replace the preset one-time dynamic link program. However, in another embodiment, the legit app program file 5 and the corresponding preset one-time dynamic link program may belong to a single file. That is to say, the legit app program file 5 includes a sub app program that corresponds to the legit app program and the present one-time dynamic link program. In this way, the operating system 311 is not able to read the legit app program and the first one-time dynamic link program individually, and is required to wait until the preset one-time dynamic link program has been replaced by the first one-time dynamic link program, so as to read the legit app program which includes the sub app program and the first one-time dynamic link program. Specifically, the preset one-time dynamic link program includes preset authentication data and a preset control regulation, and the protection unit 15 transmits the first authentication data and the first control regulation to the legit app program, such that the first authentication data and the first control regulation are substituted for the preset authentication data and the preset control regulation, respectively.

When the authentication unit 14 and the to-be-authenticated app program are required to conduct authentication once again, i.e., a re-authentication process, the authentication data generation unit 11 is further configured to generate second authentication data, and the control regulation generation unit 12 is further configured to generate a second control regulation. Specifically, the second authentication data include at least one of another one-time authentication algorithm, another one-time password and another one-time authentication code. The second control regulation includes at least one of another one-time access regulation and another one-time instruction regulation. The one-time dynamic link generation unit 13 is further configured to generate a second one-time dynamic link program based on the second authentication data and the second control regulation. The protection unit 15 transmits the second one-time dynamic link program to the legit app program executed in the operating system 311 such that the first authentication data and the first control regulation are substituted respectively by the second authentication data and the second control regulation. At this moment, the legit app program serves as the to-be-authenticated app program once again. Accordingly, the authentication unit 14 receives the second authentication data from the to-be-authenticated app program, and proceeds to authenticate the to-be-authenticated app program once again. Meanwhile, the to-be-authenticated app program receives the second authentication data from the authentication unit 14, and proceeds to authenticate the authentication unit 14 once again.

Figure 2:
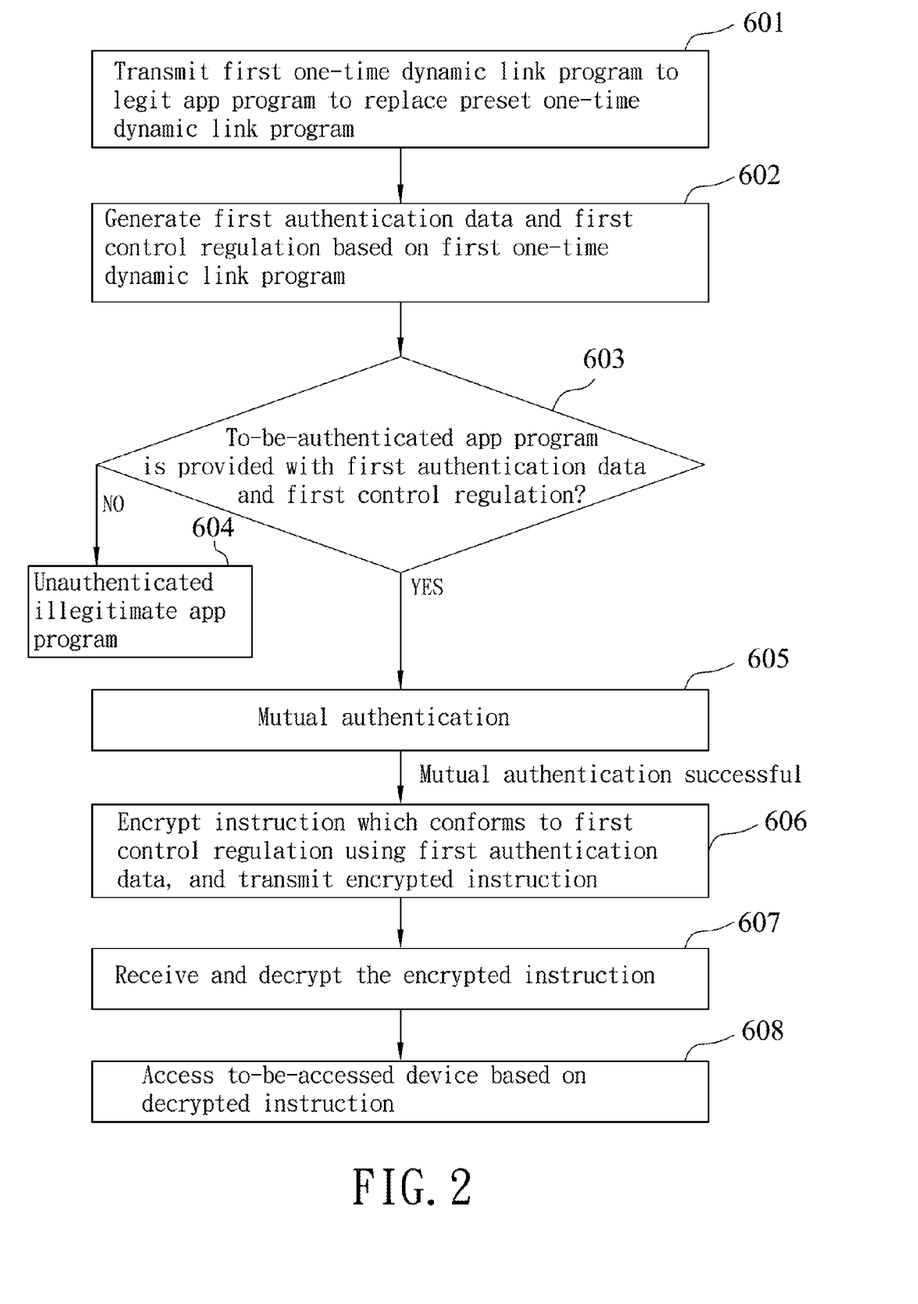
FIG. 2 is a flow chart illustrating an authentication process of an embodiment of a secure access method for an app program according to the present invention.
Figure 3:
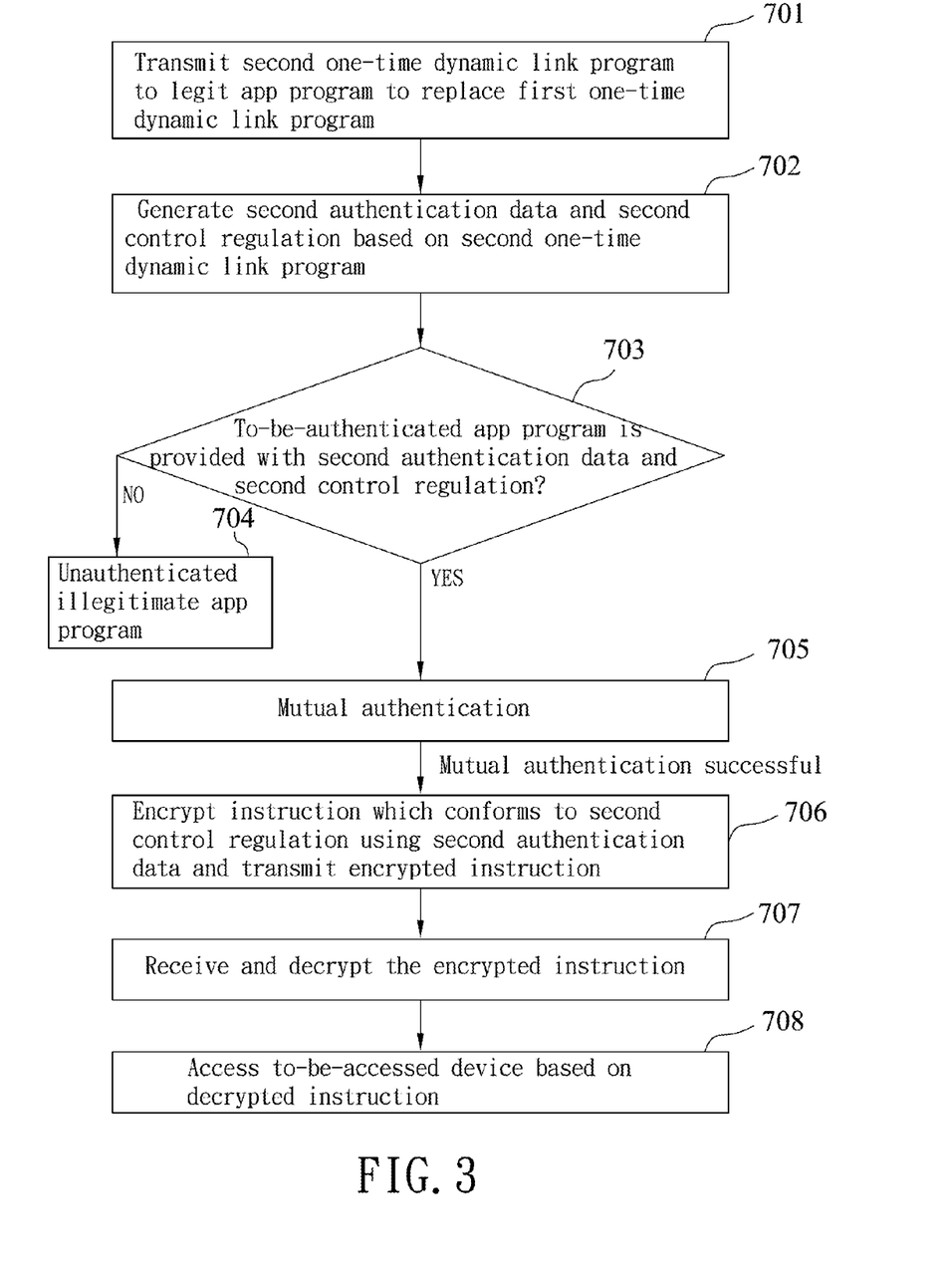
FIG. 3 is a flow chart illustrating a re-authentication process of the embodiment of the secure access method for an app program according to the present invention.

Referring to FIG. 2 and FIG. 3, an embodiment of a secure access method for an app program according to the present invention is illustrated. The secure access method is to be implemented by the secure access device 1 and includes the authentication process and the re-authentication process.

Referring to FIG. 1 and FIG. 2, the secure access method according to the present invention includes the following steps.

In step 601, when the operating system 311 is accessing the secure area 41 of the storage device 4 via the secure access device 1 for loading the legit app program file 5 to be executed on the operating system 311 as the legit app program and for loading the corresponding preset one-time dynamic link program, the authentication data generation unit 11 generates the first authentication data, the control regulation generation unit 12 generates the first control regulation, and the one-time dynamic link generation unit 13 generates the first one-time dynamic link program based on the first authentication data and the first control regulation. The protection unit 15 transmits the first one-time dynamic link program to the legit app program executed in the operating system 311 to substitute for the preset one-time dynamic link program.

In step 602, the legit app program generates the first authentication data and the first control regulation based on the first one-time dynamic link program.

It is noted that since there may exist security flaws in the operating system 311, the legit app program is vulnerable to being tampered with during the process of loading/executing the legit app program file into/on the operating system 311. Therefore, an app program executed in the operating system 311 is required to be authenticated so as to access the to-be-accessed device, such as to control the to-be-controlled device 2. The app program executed in the operating system 311 thus serves as a to-be-authenticated app program.

In step 603, the authentication unit 14 makes a determination as to whether the to-be-authenticated app program executed in the operating system 311 is provided with the first authentication data and the first control regulation.

In step 604, when a result of the determination made in step 603 is negative, it means that the secure access device 1 identifies the to-be-authenticated app program as an unauthenticated illegitimate app program and thus disallows the illegitimate app program to access the to-be-accessed device.

In step 605, when the result of the determination made in step 603 is affirmative, the mutual authentication is to be performed. Specifically, the authentication unit 14 receives the first authentication data from the to-be-authenticated app program, and proceeds to authenticate the to-be-authenticated app program, and the to-be-authenticated app program receives the first authentication data from the authentication unit 14, and proceeds to authenticate the authentication unit 14 of the secure access device 1. The first authentication data received by the to-be-authenticated app program from the authentication unit 14 is the first authentication data generated by the authentication data generation unit 11.

Once the authentication unit 14 and the to-be-authenticated app program have successfully completed the aforementioned mutual authentication therebetween, meaning that the to-be-authenticated app program is identified as the legit app program 5, the process proceeds to step 606. In step 606, the legit app program encrypts an instruction, which conforms to the first control regulation, using the first authentication data of the legit app program to obtain an encrypted instruction, and transmits the encrypted instruction to the processing unit 16.

In step 607, the authentication unit 14 activates the processing unit 16 such that the processing unit 16 receives the encrypted instruction and decrypts the encrypted instruction according to the first authentication data, which is generated by the authentication data generation unit 11, to obtain a decrypted instruction.

In step 608, the processing unit 16 accesses the to-be-accessed device based on the decrypted instruction, so that the legit app program is able to access the to-be-access device, such as to control the to-be-controlled device 2, via the processing unit 16.

Referring to FIG. 1 and FIG. 3, steps of the re-authentication process of the secure access method according to the present invention is illustrated. There may be multiple situations where the re-authentication process is required. For example, in one scenario, the re-authentication process is called whenever the legit app program intends to transmit an instruction to control the to-be-controlled device 2 once again. In another scenario, it is only when the legit app program intends to transmit specific instructions to control the to-be-controlled device 2 is the re-authentication process called. In still another scenario, the re-authentication process is called every predetermined time period. Different situations where the re-authentication process is called may be set according to different needs. The re-authentication process can prevent a situation where the legit app program has been replaced or tampered with unnoticed to become an illegitimate app program, whereby the illegitimate app program would gain access to the to-be-accessed device if the re-authentication process is not performed. Furthermore, the re-authentication process allows changes to be made to the control regulation between the secure access device 1 and the legit app program 5. Detailed description associated with the steps of the re-authentication process is provided hereinafter.

In step 701, the authentication data generation unit 11 generates the second authentication data, the control regulation generation unit 12 generates the second control regulation, and the one-time dynamic link generation unit 13 generates the second one-time dynamic link program based on the second authentication data and the second control regulation. The protection unit 15 transmits the second one-time dynamic link program to the legit app program executed in the operating system 311 to substitute for the first one-time dynamic link program.

In step 702, the legit app program generates the second authentication data and the second control regulation based on the second one-time dynamic link program.

It is noted that since the app program executed in the operating system 311 is required to be re-authenticated so as to access the to-be-accessed device once again, such as to control the to-be-controlled device 2 again, the app program executed in the operating system 311 thus serves as a to-be-authenticated app program.

In step 703, the authentication unit 14 makes another determination as to whether the to-be-authenticated app program executed in the operating system 311 is provided with the second authentication data and the second control regulation.

In step 704, when a result of said another determination made in step 703 is negative, it means that the secure access device 1 identifies the to-be-authenticated app program as an unauthenticated illegitimate app program and thus disallows the illegitimate app program to access the to-be-accessed device.

In step 705, when the result of said another determination made in step 703 is affirmative, the mutual authentication is to be performed. Specifically, the authentication unit 14 receives the second authentication data from the to-be-authenticated app program, and proceeds to authenticate the to-be-authenticated app program, and the to-be-authenticated app program receives the second authentication data from the authentication unit 14, and proceeds to authenticate the authentication unit 14 of the secure access device 1. The second authentication data received by the to-be-authenticated app program from the authentication unit 14 is the second authentication data generated by the authentication data generation unit 11.

After the authentication unit 14 and the to-be-authenticated app program have successfully completed the aforementioned mutual authentication therebetween, meaning that the to-be-authenticated app program is identified as the legit app program 5, the process proceeds to step 706. in step 706, the legit app program encrypts another instruction, which conforms to the second control regulation, using the second authentication data of the legit app program to obtain another encrypted instruction, and transmits the another encrypted instruction to the processing unit 16.

In step 707, the authentication unit 14 activates the processing unit 16 such that the processing unit 16 receives the another encrypted instruction and decrypts the another encrypted instruction according to the second authentication data, which is generated by the authentication data generation unit 11, to obtain another decrypted instruction.

In step 708, the processing unit 16 accesses the to-be-accessed device based on the another decrypted instruction, so that the legit app program is able to access the to-be-access device, such as to control the to-be-controlled device 2, via the processing unit 16.

To sum up, by storing the legit app program file 5 in the secure area 41 of the storage device 4, neither the operating system 311 nor malicious software is able to delete or write the legit app program file 5 in the secure area 41. Therefore, the only chance that the same may be copied, tampered with or implanted with malicious software is during its execution in the operating system 311 as the legit app program. Nevertheless, by means of the protection unit 15 which transmits the first one-time dynamic link program to the legit app program which is executed in the operating system 311, once the legit app program is copied, tampered with, or implanted with malicious software, the legit app program no longer retains the first one-time dynamic link program or the first one-time dynamic link program is changed, so that the legit app program, which serves as the to-be-authenticated app program, cannot be authenticated by the authentication unit 14 as legit. In this way, only the legit app program 5 which is provided with the first authentication data and the first control regulation is capable of accessing the to-be-accessed device.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A secure access method for an application (app) program, and to be implemented by a secure access device which includes first authentication data and a first control regulation, the secure access method comprising the steps of:

A) the secure access device making a determination as to whether a to-be-authenticated app program, which is executed in an operating system, is provided with the first authentication data and the first control regulation, wherein the first authentication data and the first control regulation are generated in the secure access device distinctly for each app program and wherein a one-time dynamic link program is generated based on the first authentication data and the first control regulation and used by the to-be-authenticated app program to demonstrate to the secure access device possession of the first control regulation and the first authentication data, wherein when the determination is positive, the to-be-authenticated app program is allowed to mutually authenticate with the secure access device, wherein successful mutual authentication is required to access a to-be-accessed device; and B) when a result of the determination made in step A) is negative, identifying the to-be-authenticated app program as an unauthenticated illegitimate app program, and disallowing the illegitimate app program to access the to-be-accessed device.

2. The secure access method according to claim 1, the secure access device being coupled between a main memory, which is loaded with the operating system, and a storage device, the operating system being unable to delete or write a legit app program file stored in a secure area of the storage device, the secure access method, prior to step A), further comprising the step of:

C) when the operating system is accessing the secure area of the storage device for loading the legit app program file, and when the legit app program file is executed in the operating system to serve as a legit app program, transmitting the first authentication data and the first control regulation to the legit app program;
wherein the legit app program executed in the operating system serves as the to-be-authenticated app program in step A).

3. The secure access method according to claim 2, the legit app program file including a sub app program, preset authentication data and a preset control regulation, wherein step C) further includes:
transmitting the first authentication data and the first control regulation to the legit app program which is executed in the operating system, so as to substitute the first authentication data and the first control regulation for the preset authentication data and the preset control regulation, respectively.

4. The secure access method according to claim 2, the secure zone of the storage device storing the legit app program file as well as corresponding preset authentication data and a corresponding preset control regulation, wherein step C) further includes:
when the operating system is accessing the secure area of the storage device for loading the legit app program file, the preset authentication data and the preset control regulation, and when the legit app program file is executed in the operating system to serve as a legit app program, transmitting the first authentication data and the first control regulation to the legit app program, so as to substitute the first authentication data and the first control regulation for the preset authentication data and the preset control regulation, respectively.

5. The secure access method according to claim 2, further comprising:
D) when the result of the determination made in step A) is affirmative, performing mutual authentication which includes
receiving the first authentication data from the to-be-authenticated app program,
proceeding to authenticate the to-be-authenticated app program, and
transmitting the first authentication data to the to-be-authenticated app program for enabling the to-be-authenticated app program to proceed to authenticate the secure access device;
E) after the mutual authentication has been successfully completed, identifying the to-be-authenticated app program as the legit app program, and enabling the legit app program to transmit an instruction which conforms to the first control regulation to the secure access device; and
F) accessing the to-be-accessed device based on the instruction, so that the legit app program is able to access the to-be-access device via the secure access device.

6. The secure access method according to claim 5,
wherein step E) includes enabling the legit app program to encrypt the instruction using the first authentication data of the legit app program to obtain an encrypted instruction, and to transmit the encrypted instruction to the secure access device;
the secure access method, between steps E) and F) further comprising the step of
G) receiving the encrypted instruction and decrypting the encrypted instruction according to the first authentication data of the secure access device to obtain a decrypted instruction; and
wherein step F) includes accessing the to-be-accessed device based on the decrypted instruction.

7. The secure access method according to claim 5, the secure access device further including second authentication data and a second control regulation, the secure access method, subsequent to step F), further comprising:
performing a re-authentication process which includes the steps of
H) transmitting the second authentication data and the second control regulation to the legit app program which is executed in the operating system to substitute respectively for the first authentication data and the first control regulation, the legit app program executed in the operating system serving as the to-be-authenticated app program once again, and
I) receiving the second authentication data from the to-be-authenticated app program, proceeding to authenticate the to-be-authenticated app program once again, and transmitting the second authentication data to the to-be-authenticated app program for enabling the to-be-authenticated app program to proceed to authenticate the secure access device once again.

8. The secure access method according to claim 1, wherein the first control regulation includes at least one of a one-time access regulation and a one-tome instruction regulation, the one-time access regulation being an access regulation on instructions transmitted by the legit app program to the secure access device, the one-time instruction regulation being a code regulation on instructions for the secure access device and the legit app program.

9. The secure access method according to claim 8, the secure access device being coupled between a main memory, which is loaded with the operating system, and a storage device, wherein the one-time access regulation of the first control regulation includes an access regulation on an instruction transmitted by the legit app program to the secure access device for accessing a hidden area of the storage device, the hidden area being unable to be detected, read or written by the operating system.

10. The secure access method according to claim 1, wherein the first authentication data includes at least one of a one-time authentication algorithm, a one-time password and a one-time authentication code.

11. A secure access device for an app program, said secure access device to be coupled between a main memory, which is loaded with an operating system, and a to-be-accessed device, said secure access device being configured to determine whether a to-be-authenticated app program executed in the operating system is allowed to access the to-be-accessed device, and comprising: an authentication data generation unit configured to generate first authentication data; a control regulation generation unit configured to generate a first control regulation; and an authentication unit configured to make a determination as to whether the to-be-authenticated app program executed in the operating system is provided with the first authentication data and the first control regulation, wherein the first authentication data and the first control regulation are distinct for each app program and wherein a one-time dynamic link program is generated based on the first authentication data and the first control regulation and used by the to-be-authenticated app program to demonstrate to the secure access device possession of the first control regulation and the first authentication data, wherein when the determination is positive, the to-be-authenticated app program is allowed to mutually authenticate with the secure access device, wherein successful mutual authentication is required to access the to-be-accessed device, and when a result of the determination is negative, to identify the to-be-authenticated app program as an unauthenticated illegitimate app program, and to disallow the illegitimate app program to access the to-be-accessed device.

12. The secure access device according to claim 11, the to-be-accessed device including a storage device, the operating system being unable to delete or write a legit app program file in a secure area of the storage device, said secure access device further comprising:
a protection unit which, when the operating system is accessing the secure area of the storage device for loading the legit app program file, which when executed serving as a legit app program executed in the operating system, is configured to transmit the first authentication data and the first control regulation to the legit app program;
wherein the legit app program executed in the operating system serves as the to-be-authenticated app program.

13. The secure access device according to claim 12, the legit app program file including a sub app program, preset authentication data and a preset control regulation, wherein said protection unit is further configured to transmit the first authentication data and the first control regulation to the legit app program which is executed in the operating system, so as to substitute the first authentication data and the first control regulation for the preset authentication data and the preset control regulation, respectively.

14. The secure access device according to claim 12, the secure zone of the storage device storing the legit app program file as well as corresponding preset authentication data and a preset control regulation, wherein, when the operating system is accessing the secure area of the storage device for loading the legit app program file, the preset authentication data and the preset control regulation, and when the legit app program file is executed in the operating system to serve as the legit app program, said protection unit is further configured to transmit the first authentication data and the first control regulation to the legit app program, so as to substitute the first authentication data and the first control regulation for the preset authentication data and the preset control regulation, respectively.

15. The secure access device according to claim 12, further comprising a processing unit;
wherein, when the result of the determination made by said authentication unit is affirmative, said authentication unit is further configured to perform mutual authentication which includes
receiving the first authentication data from the to-be-authenticated app program,
proceeding to authenticate the to-be-authenticated app program, and
transmitting the first authentication data to the to-be-authenticated app program for enabling the to-be-authenticated app program to proceed to authenticate said secure access device;
wherein, after the mutual authentication has been successfully completed, said authentication unit identifies the to-be-authenticated app program as the legit app program, and activates said processing unit to receive an instruction, which is transmitted by the legit app program to said secure access device and which conforms to the first control regulation; and
wherein said processing unit is configured to access the to-be-accessed device based on the instruction, so that the legit app program is able to access the to-be-access device via said processing unit.

16. The secure access device according to claim 15,
wherein said secure access device enables the legit app program to encrypt the instruction using the first authentication data of the legit app program to obtain an encrypted instruction, and to transmit the encrypted instruction to said secure access device; and
wherein said processing unit receives the encrypted instruction, decrypts the encrypted instruction according to the first authentication data generated by said authentication data generation unit to obtain a decrypted instruction, and accesses the to-be-accessed device based on the decrypted instruction.

17. The secure access device according to claim 15, further configured to perform a re-authentication process,
wherein said authentication data generation unit further generates second authentication data, said control regulation generation unit further generates a second control regulation, and said protection unit transmits the second authentication data and the second control regulation to the legit app program which is executed in the operating system so as to substitute respectively for the first authentication data and the first control regulation, the legit app program executed in the operating system serving as the to-be-authenticated app program once again;
wherein said authentication unit receives the second authentication data from the to-be-authenticated app program, proceeds to authenticate the to-be-authenticated app program once again, and transmits the second authentication data to the to-be-authenticated app program for enabling the to-be-authenticated app program to proceed to authenticate said authentication unit once again.

18. The secure access device according to claim 11, wherein the first control regulation includes at least one of a one-time access regulation and a one-tome instruction regulation, the one-time access regulation being an access regulation on instructions transmitted by the legit app program to said processing unit, the one-time instruction regulation being a code regulation on instructions for said processing unit and the legit app program.

19. The secure access device according to claim 18, the to-be-accessed device including a storage device, wherein the one-time access regulation of the first control regulation includes an access regulation on an instruction transmitted by the legit app program to said processing unit for accessing a hidden area of the storage device, the hidden area being unable to be detected, read or written by the operating system.

20. The secure access device according to claim 11, wherein the first authentication data includes at least one of a one-time authentication algorithm, a one-time password and a one-time authentication code.

* * * * *